United States Patent [19]

Bidler

[11] 4,104,176

[45] Aug. 1, 1978

[54] POROUS LUBRICANT-IMPREGNATED BEARING

[75] Inventor: James L. Bidler, Woodbury, Minn.

[73] Assignee: Minnesota Mining and Manufacturing Company, Saint Paul, Minn.

[21] Appl. No.: 796,789

[22] Filed: May 13, 1977

Related U.S. Application Data

[63] Continuation of Ser. No. 615,993, Sep. 23, 1975, abandoned.

[51] Int. Cl.$^2$ .................. C10M 5/00; C10M 7/00; F16D 69/00; F16C 0/00
[52] U.S. Cl. .................................................. 252/12.2
[58] Field of Search ................... 252/12.2, 12, 12.6, 252/12.4

[56] References Cited

FOREIGN PATENT DOCUMENTS 898,831 12/1953 Fed. Rep. of Germany .......... 252/12.2
1,908,482 8/1970 Fed. Rep. of Germany .......... 252/12.2

*Primary Examiner*—Irving Vaughn
*Attorney, Agent, or Firm*—Cruzan Alexander; Donald M. Sell; Roger R. Tamte

[57] ABSTRACT

A porous lubricant-impregnated bearing comprising a matrix of closely packed, discrete particles, such as glass microspheres, bonded together with a bonding material that is different from the particles, such as a cured organic bonding material, and that only partially fills the interstices between the particles; and a migratable lubricant dispersed in the unfilled interstices.

19 Claims, 2 Drawing Figures

POROUS LUBRICANT-IMPREGNATED BEARING

This is a continuation of application Ser. No. 615,993 filed Sept. 23, 1975 and now abandoned.

INTRODUCTION

The present invention provides new constructions and new processes of manufacture for porous lubricant-impregnated bearings. The new constructions and processes do not rely on powder metallurgy, which was the original source for porous bearings over 50 years ago and which has remained the conventional basis for their manufacture ever since. Important advantages flow from the new constructions and processes, including capacity to support heavier-loaded, faster-rotating shafts; greater flexibility in composition, size, and shape of the bearings; lighter weight; and manufacturing economies, all of which promise an expanded utility for porous bearings.

Briefly, a bearing of the invention comprises a matrix of closely packed, solid, discrete particles held together, not through the compaction and sintering of powder metallurgy, but with a bonding material disposed in the interstices between the particles. The bonding material only partially fills the interstices and leaves an interconnected uniform porosity sufficient to store and provide at the bearing surface the lubricant needed for a lubricant-impregnated bearing.

A number of factors contribute to the advantages of bearings of the invention. For one, a bearing of the invention can typically be prepared without use of the severe compacting pressures used in making conventional porous metal bearings. These pressures are intended to deform the metal particles, and they undoubtedly result in elimination of pores and nonuniformity of pore structure. By contrast, bearings of the invention can be made without deformation of particles, and with the particles bonded together with controlled amounts of bonding material so as to leave spaces between substantially all adjacent particles. The result is a more uniform porosity, and a consequent more uniform feeding of lubricant to the bearing surface.

Uniformity in porosity is further enhanced in bearings of the invention by the preferred use of uniformly shaped matrix particles such as spheres, since such uniformity in shape provides a more ordered network of interstices. This regularity is further assisted by use of particles in a narrow range of sizes.

Sphericity also contributes to a more fine-grained porosity by permitting more compact packing of particles and use of very fine particles (manufacturers of porous metal bearings have generally been limited to rather large-sized particles in order to continuously feed the particles into automatic pressing equipment). The fine-grained porosity makes oil more uniformly available over the bearing surface, and resists pressure developed during rotation of a supported shaft which tends to force the lubricant into the bearing.

An important processing advantage arises by use of bonding materials such as organic polymeric bonding materials, which exhibit controlled flow under moderate pressure. A mixture of matrix particles and bonding material can thus be initially compacted in a mold, and rapidly ejected for further treatment. The resulting short in-mold time for bearings of the invention maximizes production rates on the expensive mold apparatus.

Preferred bearings of the invention are bonded together with organic bonding materials that may be cured at rather low temperatures. These low temperatures permit inclusion of components and ingredients that are excluded by the high sintering temperatures required for conventional porous metal bearings. The use of lower temperatures also means that less energy and expense are required in the manufacture of bearings of the invention.

BACKGROUND PRIOR ART

Porous structures made by bonding a matrix of particles with bonding material so as to leave the interstices between the particles partially unfilled have been previously taught and used for various purposes, including porous vacuum molds (see Farrell, U.S. Pat. No. 3,166,615) and filters. However, these prior structures have not been impregnated with lubricant, would not be useful as bearings, and in no way predict the improvement in bearings achieved by the invention.

As to bearings themselves, glass microspheres and other particles have previously been used as wear-improving fillers for polymeric bearing structures; see Li, U.S. Pat. No. 3,224,966; Strub, U.S. Pat. No. 3,067,135; Graver, U.S. Pat. No. 3,575,857; Filippov, U.S. Pat. No. 3,843,527; Bre et al, U.S. Pat. No. 3,257,317; and Mizuno, U.S. Pat. No. 3,647,500 (which describes an "oil-free slider" bearing structure made by sintering a mixture of resin and up to 30 weight-percent glass particles; the structure is porous if very large resin particles are used and may then be impregnated with mineral wax). Bearings of the invention contrast with such prior-art suggestions in that the closely packed particles in bearings of the invention provide the matrix of the bearing structure, rather than being dispersed as a filler in a polymeric matrix; and the particles are bonded together by a bonding material that only partially fills the interstices between the particles, leaving a controlled interconnected porosity suitable for storing and feeding a migratable lubricant to a bearing surface. In short, the prior-art bearings are not porous lubricant-impregnated bearings (i.e., do not have the essential properties of conventional porous metal bearings) and do not suggest the advantages obtained by the bearing structure and processes of the present invention.

DETAILED DESCRIPTION

Figure 1:
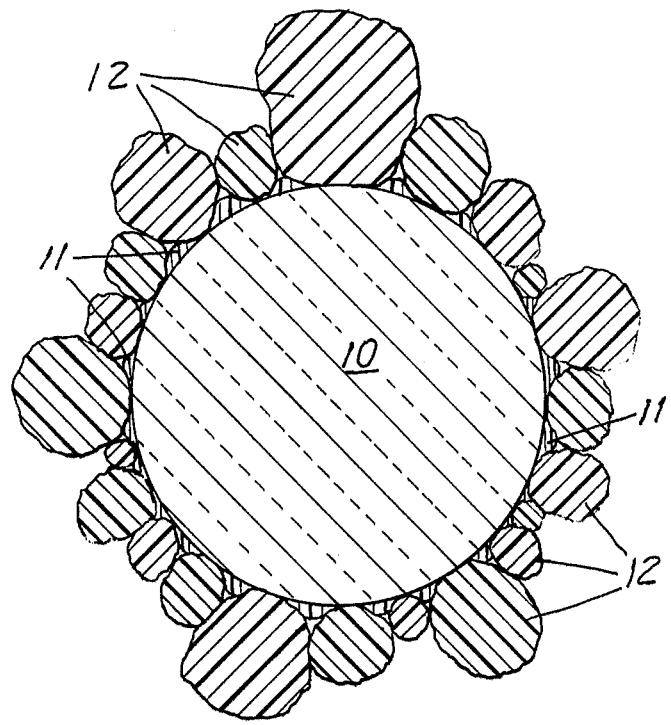

The invention will be illustrated further by the following examples, in which parts are by weight unless otherwise specified.

EXAMPLE 1

Twenty pounds (9.1 kilograms) of glass microspheres having diameters from 37 to 53 micrometers (Potters Industries "Ballotini Impact Beads," stock size J, class 1 fines) were given a silane treatment by mixing them for 10 minutes with 64 cubic centimeters of dilute aminosilane solution (Dow Z-6020) in a 20-quart (18.9-liter) "Hobart" Brand mixer set at low speed. The coated microspheres were dried overnight at 150° F (66° C), and then mixed again for 15 minutes to break up all lumps.

The treated microspheres were then given a tacky coating of bonding material by mixing them in a solution consisting of 25.4 parts of diglycidyl ether of bisphenol A ("Epon 828," available from Shell Chemical Company), 8.29 parts of a higher-molecular-weight diglycidyl ether of bisphenol A ("Epon 1001"), 6.76 parts of isophthalyldihydrazide, 15.6 parts of titanium dioxide, 1.05 parts of an amino-substituted bentonite, 1.6 parts of toluene, and 41.23 parts of methylethylketone. This solution was added to the microspheres in an amount of 564 cubic centimeters and the mixer operated for 15 minutes at low speed.

The resulting clay-like mixture was placed in a Patterson-Kelley twin-shell blender (intensifier bar on) and mixed for 5 minutes with 2.5 pounds (1.14 kg) of a micropulverized B-staged curable organic bonding material (95 percent of the bonding material was greater than 3.1 micrometers in size; 50 percent was greater than 9 micrometers; and 5 percent was greater than 18 micrometers). This bonding material included 69 parts of a diglycidyl ether of bisphenol A ("Epon 1001") modified with a few tenths of a part of a modified acrylate, which is a leveling agent commercially available under the trade name "Modaflow" from Monsanto Company; 0.44 parts of tri(dimethylaminoethylphenol), which is a curative available under the trade name "DMP-30" from Rohm and Haas; 5.5 parts of a catalyst blend comprising about 80 parts by weight isophthalyldihydrazide and 20 parts dicyandiamide; and 25 parts of graphite particles averaging about 9 micrometers in size (Superior Superflake M-238).

The result was a mass of coated microspheres, such as the microsphere 10 shown in FIG. 1, having a tacky, continuous or film-like coating 11 of bonding material by which a layer of particles 12 of bonding material was adhered to the microspheres. The mass was screened through a 60-mesh screen (U.S. Screen) to remove agglomerates, giving a yield of 90 percent.

Figure 2:
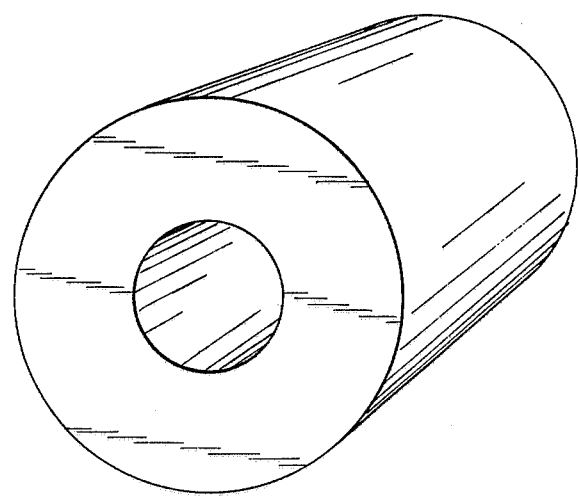

A portion of the mass of coated microspheres was then placed in a mold and compacted at room temperature under a pressure of 10,000 pounds/square inch (700 kilograms/square centimeter) to prepare a hollow cylinder one inch (2.5 cm) long with an outer diameter of 1.5 inches (3.8 cm) and an inner diameter of 1.01 inch (2.8 cm). The resulting "green" compact was taken from the mold and heated to 400° F (205° C) for 10 minutes, whereupon the particles of bonding material melted, flowed, and cured. From other tests on similarly prepared samples, it is known that the cylinder after curing of the binder material was about 23 percent porous and the pores had an average size of about 3 micrometers and a range of pore sizes of about 2–8 micrometers (in contrast to the 2–40 micrometer range of typical porous bronze bearings) as measured with a Winslow Amico Porosimeter. The cylinder was vacuum-impregnated with 3.55 grams of oil (supplied by Texaco and satisfying Mil-L-7808 D). The resulting bearing was generally as illustrated in FIG. 2.

The impregnated cylinder was tested as a bearing against a cold-rolled 1-inch-diameter (2.5 cm) steel (B1112) shaft, using an Arguto "Simulife" Bearing Test Machine. The test started at 550 revolutions/minute with a 50-pound (22.7 kg) radial load. The load was increased 50 pounds (22.7 kg) each hour to a maximum of 450 pounds (205 kg), which was equivalent to a PV of 64,500. At that time the bearing began to smoke and the test was stopped. Dimensional measurements after the test was stopped revealed that the inside diameter of the bearing had increased 0.0015 inch (0.0038 cm); the length had increased 0.007 inch (0.018 cm); and the bearing weight had decreased 0.35 gram. The coefficient of friction varied from 0.056 to 0.180 during the test.

The following example illustrates the use of a mixture of glass microspheres and metal particles as matrix particles in a bearing of the invention.

EXAMPLE 2

A mixture was prepared from 6¼ pounds (2.8 kg) of bonding-material-coated glass microspheres as shown in FIG. 1 and as described in Example 1 and 3¾ pounds (1.7 kg) of aluminum powder (Alcoa 123) having an average particle size of approximately 20 micrometers. These materials were dry-mixed on a Patterson-Kelley twin-shell blender with the intensifier bar on, for one minute. A hollow cylinder of the same dimensions as the one in Example 1 was made using the same compacting pressure, curing temperature, and curing time as described in Example 1. The porosity of this cylinder was measured at 20 percent and the mean pore size as 2 micrometers.

After impregnation with oil in the manner described in Example 1, the cylinder was tested as a bearing using the same equipment and test conditions as described in Example 1. The test was run at 550 revolutions/minute with an initial radial load of 50 pounds (22.7 kg), which was increased at the rate of 50 pounds (22.7 kg) per hour, to the 700-pound (318 kg) limit of the test equipment. The maximum load and speed corresponds to a PV of 100,800. Dimensional measurements after the test revealed no change in length or diameter and a weight loss of 0.10 gram.

The improvement in results shown in Example 2 is at least partially attributed to the indicated smaller pore size and to an improved thermal conductivity for the sample (8.0 BTU/hour/ft$^2$/ft/° F as opposed to 3.6 BTU/hour/ft$^2$/ft/° F for Example 1). The improved thermal conductivity permits better dissipation of heat from the shaft-bearing interface, which otherwise tends to break down or drive off oil, and causes undesired dimensional changes and fatigue of the bearing and shaft materials. Preferably, bearings of the invention have a thermal conductivity of at least 3, and more preferably at least 7, BTU/hour/ft$^2$/ft/° F. The best improvement in thermal conductivity has been noted when metal particles not coated with bonding material are mixed with coated glass microspheres, although useful results are also obtained by use of metal particles coated with bonding material.

Glass microspheres are preferred as at least the basic matrix particle (i.e. comprising at least a majority by weight of the matrix particles) in bearings of the invention, since glass has good compressive strength; it is readily formed into spherical shapes and in desired sizes; and it can be obtained inexpensively. Other useful crush-resisting, or non-friable matrix particles which may be used in whole or part include inorganic particles such as sand granules; organic polymeric particles, which are generally in a cured form at least in the completed bearing; and metal particles. Spherical particles are preferred; but irregular particles, as represented by sand granules or irregular metal particles, may also be used. The particles should be solid in contrast to liquid (they may be hollow or porous) and preferably are nondeformable at at least moderate compacting pressures such as 10,000 pounds/square inch to allow the use of such pressures to form a "green" compact. The matrix particles also should not flow during a curing operation to maintain the desired control of porosity.

The size of the particles may be varied to obtain varied properties, and mixtures of differently sized particles may be used either in random mixture or in discrete layers. For example, the structure at the bearing surface of a bearing of the invention may have one porosity and an inner layer of the bearing, which stores lubricant to be metered to the bearing surface, may have a different porosity. For most bearings of the invention, the matrix particles will be between about 10 and 200 micrometers, and preferably less than about 100 micrometers, in diameter; but useful results can be obtained outside that range.

A variety of different bonding materials can be used to bond the particles together. As a general rule the bonding material is different from the matrix particles at least in flow characteristics during manufacture of bearings: at some point in the manufacturing process the bonding material generally flows and fuses or blends with itself. Preferably organic materials are used, andd preferably they are thermosetting or curing materials (that is, they chemically react to become relatively infusible and insoluble). Such materials are conveniently incorporated into the bearing, and once cured they have good dimensional stability even at high temperatures, and good resistance to attack by lubricants or other chemicals. Epoxy resins, i.e. organic materials having more than one 1,2-epoxy group per molecule, are preferred and may take the form, inter alia, of polyglycidyl ethers of polyols such as bisphenol A; so-called novolac epoxies; and cycloaliphatic epoxies. Besides epoxy resins, other useful bonding materials include polyesters, polyurethanes, phenolics, and such inorganic materials as silicates, which are capable of especially high temperatures and chemical resistance.

The inclusion of graphite in the binder material is preferred because of the additional lubricity it provides, which is especially useful during startup of rotation of a shaft in the bearing. Other materials that could be included instead of graphite are molybdenum disulfide and tungsten disulfide. When used, such materials will generally comprise between about 1 and 50 weight-percent of the bonding material.

The method used in the above examples for coating bonding material onto matrix particles is generally described in Vanstrum, U.S. Pat. No. 3,175,935. This method is desirable since it allows a desired amount of bonding material to be mixed with the matrix particles and leaves the particles in a free-flowing form. Alternatively, the bonding material may all be applied as a film-like coating on the particles (see Farrell, U.S. Pat. No. 3,166,615), or particulate bonding material and matrix particles without a tack coat may be mixed together.

Whatever method is used, a product is formed in which the particles form a closely packed matrix (i.e., the particles are typically in at least near-contact, separated from their nearest neighboring particles by no more than about 50 percent of their diameter so as to provide an interstitial structure between the particles) and bonded together so as to only partially fill the interstices between the particles. The particles are generally consolidated into the described close packing without being deformed, and continue undeformed in the final product. In some embodiments of the invention at least some of the particles are pressed into direct contact. However, during a compacting operation as described in the examples, the pressure can usually be increased continuously, and the volume of the compact decreases continuously, indicating that not all particles are in direct contact.

An interesting and useful phenomenon that may be related to the contact between the particles concerns the thermal expansion properties exhibited by bearings of the invention. A bearing of the invention does not exhibit the thermal expansion characteristics of an organic material, which might be expected if a bearing of the invention were viewed as a continuous matrix of organic bonding material in which particles are dispersed. The coefficients of thermal expansion for organic materials are typically quite high (50 to 60 × $10^{-6}$ inches/inch/° F; 90 to 110 × $10^{-6}$ cm/cm/° C) and that is undesirable in a bearing. Instead, in a bearing of the invention made of glass particles and organic bonding material, the thermal coefficient of expansion is typically on the order of 14 or 15 × $10^{-6}$ inches/inch/° F (the thermal coefficient of expansion of glass is typically 5 or 6 × $10^{-6}$ inches/inch/° F). This fact suggests that the close proximity of the glass microspheres causes the coefficient of thermal expansion of glass to dominate in the bearing.

The thermal coefficient of expansion of bearings of the invention is lower than that of porous bronze, and closer to that of steel, which is advantageous for use with steel bearings or steel shells into which bearings are fit. The inside diameters of bearings of the invention may be made more near in size to the shaft that is to be supported by them because of their desired thermal coefficient of expansion.

Porosity can be controlled, among other ways, by controlling the amount of bonding material in the bearing, or the amount by which the bearing is "starved" of bonding material. Generally very strong, minimally porous bearings are obtained with about 30 volume-percent of bonding material (based on the solids content of the bearing, i.e. excluding the pore structure) when using preferred microsphere matrix particles. About 10 volume-percent gives very high porosity but minimal strength, with the most useful range generally being about 15–25 volume percent.

The porosity needed in a bearing of the invention will vary depending upon the use to which the bearing is to be put. There are ASTM specifications for porous metal bearings, developed by balancing strength requirements against oil capacity, which recite that the porosity should be at least 18 percent (ASTM B 202-55T). Most often a bearing of the invention will have a porosity of at least that much also, though useful results can be obtained at lower values. Size of the pores and distribution of pore size will also vary depending on the kind of application, and kind of lubricant, etc. An advantage of this invention, as indicated above, is that porosity, including amount, pore size, and distribution of pore sizes is susceptible to control in bearings of the invention.

Bearings of the invention can be molded and provided in various shapes but a cylindrical sleeve is the most common. One advantage of the invention is that bearings can usually be molded in their final dimensions. That is, the die part that forms the bore of the bearing can be of the exact size desired for the inside diameter of the bearing.

Lubricants commonly used in porous metal bearings will generally be useful in bearings of the invention. These lubricants are most often oily liquids but they can also be in a paste form. The lubricants are such that they will migrate during operation of a bearing under the influence of temperature and pressure developed by rotation of the shaft. The viscosity of the lubricant at operating temperature usually is related to the size and amount of pores so as to meter lubricant out of the pores in a desired manner as known in the porous bearing art.

What is claimed is:

1. A porous lubricant-impregnated bearing comprising a body shaped to support a rotating shaft and containing an interconnected pore structure filled with migratable lubricant that is drawn from the pore structure to lubricate rotation of the shaft; characterized in that said body comprises a matrix of solid discrete particles closely packed so as to define a network of interconnected interstices and bonded together with a bonding material that is different from the particles, is disposed within and chemically reacted in situ in the interstices so as to be dimensionally stable at PV's of 100,000, and only partially fills the interstices so as to leave spaces between substantially all adjacent matrix particles, whereby a uniform fine pore structure is formed from which lubricant will be uniformly drawn and maintained during rotation of said shaft.

2. A bearing of claim 1 in which at least a weight majority of said matrix particles are glass microspheres.

3. A bearing of claim 2 in which metal particles are mixed among said glass microspheres.

4. A bearing of claim 1 in which said bonding material comprises a cured organic bonding material.

5. A bearing of claim 1 in which said bonding material comprises an inorganic bonding material.

6. A bearing of claim 1 in which said bonding material includes solid lubricating particles dispersed within the bonding material.

7. A porous lubricant-impregnated bearing comprising a body shaped to support a rotating shaft and containing an interconnected pore structure filled with migratable lubricant that is drawn from the pore structure to lubricate rotation of the shaft; characterized in that said body comprises a matrix of solid discrete particles, at least a weight majority of which are glass microspheres, closely packed so as to define a network of interconnected interstices; said body further including metal particles mixed among said glass microspheres; and the matrix particles being bonded together with a cured organic bonding material that is disposed within said interstices, is chemically reacted in situ in the interstices so as to be dimensionally stable at PV's of 100,000, and only partially fills the interstices so as to leave spaces between substantially all adjacent matrix particles, whereby a uniform fine pore structure is formed from which the lubricant will be uniformly drawn and maintained during rotation of the shaft.

8. A bearing of claim 7 in which said organic bonding material includes solid lubricating particles dispersed within said bonding material.

9. A bearing of claim 7 in which said glass microspheres are completely coated with said bonding material.

10. A bearing of claim 7 in which the cured organic bonding material is based on an epoxy resin.

11. A bearing of claim 1 in which at least a portion of said matrix particles are completely coated with the bonding material.

12. A bearing of claim 1 in which said pores are less than 8 micrometers in size.

13. A bearing of claim 1 prepared by steps that include consolidating a particulate mass that comprises particles carrying a coating of B-staged organic bonding material, and then subjecting said consolidated mass to conditions that cause curing of the organic bonding material.

14. A bearing of claim 7 in which said pores are less than 8 micrometers in size.

15. A bearing of claim 7 prepared by steps that include consolidating a particulate mass that comprises glass microspheres carrying a coating of B-staged organic bonding material, and then subjecting said consolidated mass to conditions that cause curing of the organic bonding material.

16. A porous lubricant-impregnated bearing comprising a body shaped to support a rotating shaft and containing an interconnected pore structure filled with migratable lubricant that is drawn from the pore structure to lubricate rotation of the shaft; characterized in that said body comprises a matrix of solid discrete particles, at least a weight majority of which are glass microspheres, closely packed so as to define a network of interconnected interstices and coated over their exterior surface with a cured organic bonding material by which said matrix particles are bonded together, said bonding material being fused together at points of contact by only partially filling the interstices between the matrix particles so as to leave spaces between substantially all adjacent matrix particles, whereby a uniform fine pore structure is formed from which lubricant will be uniformly drawn and maintained during rotation of said shaft, said body further comprising metal particles mixed among said glass microspheres and solid particles of lubricant dispersed in said bonding material.

17. A bearing of claim 16 in which said glass microspheres are less than about 200 micrometers in diameter.

18. A bearing of claim 1 in which said matrix particles are less than about 200 micrometers in diameter.

19. A bearing of claim 7 in which said glass microspheres are less than about 200 micrometers in diameter.

* * * * *